Sept. 4, 1956 W. G. PAGDIN 2,761,542
CONVEYOR APPARATUS WITH ELECTRICALLY
ACTUATED ARTICLE ORIENTING MEANS
Filed May 5, 1955

United States Patent Office 2,761,542
Patented Sept. 4, 1956

2,761,542
CONVEYOR APPARATUS WITH ELECTRICALLY ACTUATED ARTICLE ORIENTING MEANS

William G. Pagdin, Little Silver, N. J., assignor to P. Ballantine & Sons, Newark, N. J., a corporation of New Jersey Application May 5, 1955, Serial No. 506,325
4 Claims. (Cl. 198—33)

The present invention relates to conveyor apparatus for handling articles such as packages and more particularly to an electrically actuated turning or orienting means for selectively orienting articles traveling the conveyor.

Conveyor systems for handling articles have been heretofore provided in which articles are selectively oriented as by turning or temporary stopping members while they are traveling along the conveyor course in order to attain a predetermined pattern. For example, articles may be placed on the conveyor with their length extending parallel with their path and their width (or shorter dimension) extending transversely of their path. Turning mechanisms have been provided which extend into the path of an oncoming article. When the article engages the turning mechanism, the article rotates on its axis through 90° to clear the turning means and continue on its way. However, an article during its progress along the conveyor may be stopped, for one reason or another, abreast of the turning mechanism and may then be so disposed that if the turning mechanism is then actuated, it strikes or engages the article and is prevented thereby from assuming its fully actuated position. When a solenoid utilized to actuate the turning mechanism, is energized there is an initial surge of current through its winding which rapidly subsides as soon as the solenoid plunger reaches its fully actuated position. In the event an article is stopped in position to block the turning mechanism, the surge current continues to flow through the solenoid winding and, in a relatively short time, the solenoid is damaged thereby necessitating a shut-down of the apparatus while the solenoid is replaced.

I have found that a solenoid actuated orienting mechanism may be constructed so as to eliminate all possibility of the actuating solenoid being damaged or burned out due to the mechanism being blocked by an article on the conveyor.

It is, therefore, a principal object of this invention to provide a conveyor apparatus having an improved electrically actuated orienting means for orienting articles traveling along the conveyor.

Another object is to provide an improved solenoid actuated orienting mechanism in a conveyor apparatus which when actuated serves to orient articles traveling along the conveyor with the solenoid unaffected in its operation and operable independently of the mechanism actuated thereby and unaffected by blocking of the actuated mechanism.

In accordance with the present invention the solenoid for actuating the orienting member is connected thereto through a spring in such a manner that the spring stores the energy developed by the solenoid and permits the solenoid plunger to be fully actuated in the event movement of the orienting member is blocked. When the turning member is free to move, the spring gives up the energy stored therein, transmitting it to the orienting member and thereby actuating the same. In a preferred embodiment of the present invention the orienting member is constructed in the form of an elongated lever and is pivotally mounted between adjacent rollers in a conveyor course. The lever is spring biased into its up or out position with its work arm portion extending into the path of an article approaching along the conveyor course. A solenoid has its plunger connected to the power arm of the orienting lever through a second spring in such a manner that when the plunger is retracted upon energization of the solenoid it compresses its second spring in the event movement of the lever is blocked. The springs are so chosen that the second spring exerts sufficient force to overcome the first. Consequently, when the lever becomes unblocked the second spring expands thereby swinging the lever about its pivot to its in or retracted position.

Further objects and advantages of the present invention will be apparent from the following detailed description and the accompanying drawings, in which Figure 1 is a plan view of a conveyor apparatus broken away for convenience and embodying the present invention;

Figure 1:
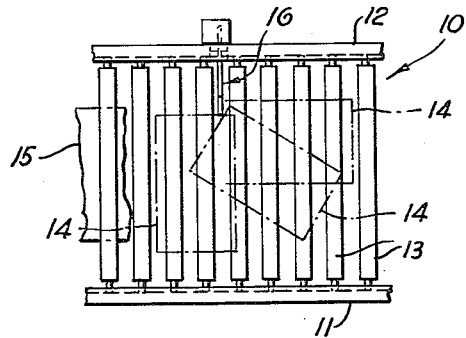

Referring now to the drawings in detail, conveyor 10 comprises a pair of spaced channel side members 11, 12 supported in any suitable manner and between which extend rollers 13. Rollers 13 are rotatably supported between side members 11, 12 and form a path along which articles such as packages 14 may travel. Rollers 13 may be driven by means of a belt 15 extending below and in contact with the same.

Orienting member 16 functions as a turning member and may be in the form of a paddle-shaped lever extending through a slot 17 formed in side member 12 between a pair of adjacent rollers 13. A pair of flanged support members 18 are secured to side member 12, one being located on each side of slot 17. Support members 18 serve to support a stub shaft 19 on which is mounted bearing 20 and which in turn serves to pivotally support turning member 16.

Mounting bracket 21 is fixed to side member 12 and is provided with a slot 22 through which the power arm 16a of turning member 16 extends. Adjacent to the free end of power arm 16a one end of a biasing spring 23 is connected thereto while the other end of spring 23 is fixed to mounting bracket 21 by means of adjusting screw 32. An adjustably mounted stop pin 24 is also connected to mounting bracket 21 and is located to engage power arm 16a intermediate its pivot and spring 23. As shown most clearly in Figure 2, spring 23 and stop pin 24 are disposed below power arm 16a. Consequently, spring 23 serves to bias power arm 16a downwardly against the upwardly presented end of stop pin 24, thereby raising the opposite extremity or work arm portion 16b of turning member 16 so that it projects above rollers 13 into the path of a package 14.

Secured to mounting bracket 21, on the side of power arm 16a away from spring 23, is a solenoid 25 having a plunger 26 presented toward power arm 16a. A link 27, connected to plunger 26, extends through a bore 28 formed through power arm 16a. The portion of link 27 projecting beyond bore 28 and away from plunger 26, carries a second spring 29 retained by nuts 30. The end of spring 29 presented toward power arm 16a engages a collar 31 slideable on link 27 and interposed between power arm 16a and spring 29. Nuts 30, in addition to retaining spring 29, are threaded on link 27 and serve as a convenient means for adjusting the tension of spring 29.

Figure 2:
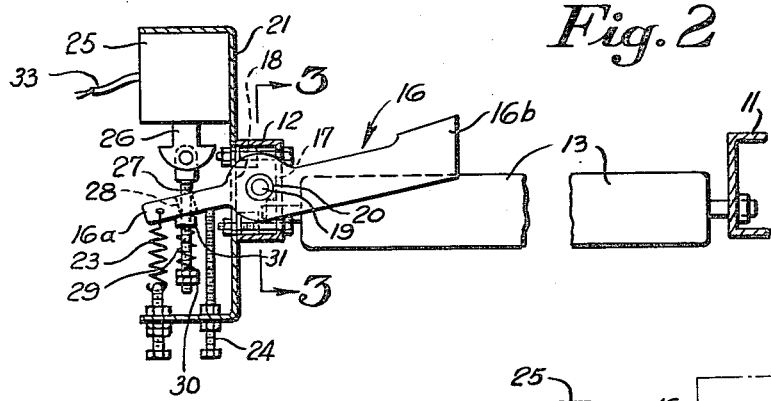
Figure 2 is a sectional view on an enlarged scale through the line 2—2 of Figure 1.
Figure 3:
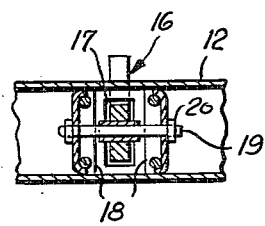
Figure 3 is a sectional view through the line 3—3 of Figure 2.

Solenoid 25 may form part of any suitable electric circuit by means of which the solenoid is energized and deenergized to actuate turning member 16. The electrical circuit forms no part of the present invention and therefore will not be described in detail here. However, it is to be understood that solenoid 25 is connected through suitable leads 33 to a control circuit and when energized retracts plunger 26. As shown in Figure 2, solenoid 25 is deenergized and plunger 26 is in its extended or downward position. As previously described, spring 23 exerts sufficient force to maintain turning member 16 with its power arm 16a against stop pin 24 and with its work arm 16b extending above adjacent rollers 13. When energized, solenoid 25 through plunger 26 and link 27 exerts sufficient force against spring 29 to rotate turning member 16 clockwise and expand spring 23. Springs 29 and 23 are so chosen and mounted that spring 29 is substantially "stronger" than spring 23. Consequently, during normal operation spring 29 will undergo little or no compression. When solenoid 25 is deenergized plunger 26 is freed and moves downwardly thereby permitting spring 23 to pivot turning member 16 counterclockwise back to its out position as shown in Figure 2.

As shown most clearly in Figure 1, turning member 16 when in its out or exposed position partially projects into the path of an oncoming package 14. Engagement of package 14 with turning member 16 results in the package being rotated through 90° at which time it then clears turning member 16 and is free to proceed along conveyor 10.

Figure 4:
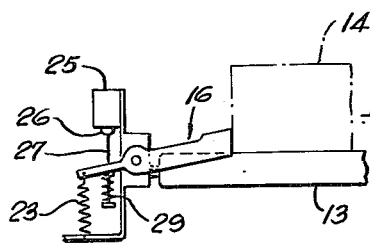
Figures 4 and 5 are fragmentary diagrammatic views illustrating the operation of the apparatus shown in Figures 1-3.
Figure 5:
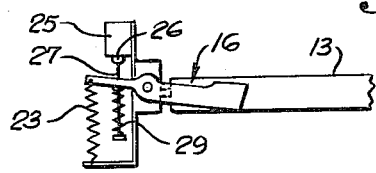

As thus far described, it will be apparent that the apparatus functions as though link 27 were rigidly connected to power arm 16a. However, in the event solenoid 25 is energized when one of the packages 14 is positioned, as indicated in Figure 4, so as to prevent clockwise rotation of turning member 16, plunger 26 on being retracted draws link 27 upward thereby compressing spring 29 against collar 31 which now abuts power arm 16a. When the obstruction to clockwise rotation of turning member 16 is removed, spring 29 is then freed to expand thereby rotating turning member 16 clockwise to its in position and expanding biasing spring 23.

The present apparatus in addition to being highly compact has the further important advantage of insuring efficient and trouble-free operation over a long period of time. In normal operation at the start of energization of solenoid 25 a surge current initially flows through the solenoid winding which exceeds the normal, steady state current. Such solenoids may be rated for operation at a continuous current of about 2 amperes while the surge current through the winding of the solenoid when it is initially energized may be as much as 10 amperes. Normally, surge current has a relatively short duration and rapidly subsides as plunger 26 reaches its fully retracted position. In practice, any obstruction which prevents movement of plunger 26 for an appreciable time causes damage or destruction of the solenoid because the large surge current continues to flow so long as normal movement of plunger 26 is prevented. Since the force exerted by solenoid 25 is transmitted to member 16 through spring 29, the solenoid is thereby rendered independent of member 16 and may be fully actuated even though movement of member 16 may be blocked.

A further advantage of the present invention resides in the fact that member 16 normally projects into the path of packages 14. Consequently, in the event of current failure member 16 remains in its exposed position. This is particularly advantageous where the orienting member is provided to perform other operations such as that of a stop bar which is intermittently energized to stop and thereby space successive packages.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a conveyor apparatus, means defining a path for objects moving therealong, an orienting member positioned for movement into and out of said path, means movably supporting said orienting member with the orienting member free for displacement between two extreme positions, resilient means urging said orienting member toward one of said positions, a solenoid, electric circuit means for energizing said solenoid, a movable link connected to said solenoid, and second resilient means extending between said orienting member and said link whereby the force exerted by said solenoid when energized is transmitted to said member through said second resilient means, and said second resilient means being stronger than said first mentioned resilient means.

2. In a conveyor apparatus, means defining a path for objects moving therealong and including a plurality of rollers rotatably supported in side-by-side spaced relation, an orienting member, means movably supporting said orienting member adjacent to said path in the space between two of said rollers with the orienting member displaceable into and out of said path, resilient means normally biasing said orienting member into said path, a movable link, second resilient means substantially stronger than said first mentioned resilient means and connected between said link and said orienting member, a solenoid having a plunger connected to said link, and electric circuit means for energizing said solenoid, the force exerted by said solenoid when energized being transmitted to said orienting member through said second resilient means.

3. In a conveyor apparatus, means defining a path for objects moving therealong and including a plurality of rollers rotatably supported in side-by-side spaced relation, an orienting member, means movably supporting said orienting member adjacent to said path in the space between two of said rollers with the orienting member displaceable into and out of said path, resilient means normally biasing said orienting member into said path and positioned on one side of said orienting member, said orienting member having a bore formed therethrough, a movable link extending through said bore and on opposite sides of said orienting member, second resilient means mounted on said link on said one side of and adapted to engage said orienting member, a solenoid positioned on the other side of said orienting member and having a plunger connected to said link, and electric circuit means for energizing said solenoid, the force exerted by said solenoid when energized being transmitted to said orienting member through said second resilient means.

4. In a conveyor apparatus, means defining a path for objects moving therealong and including a pair of spaced side members with a plurality of rollers rotatably supported in spaced side-by-side relation therebetween, an elongated orienting member, means pivotally connecting said orienting member intermediate the ends thereof to one of said side members with one end portion of the orienting member extending in the space between two of said rollers and rotatable into and out of said path, resilient means energizing the other end portion of said orienting member and normally urging the same into position with said one end portion thereof extending in said path, said other end portion of said orienting member having a bore formed therethrough, a movable link extending through said bore and on opposite sides of said orienting member, second resilient means mounted on said link on one side of said orienting member and adapted to engage said orienting member on movement of said link in one direction, a solenoid positioned on the other side of said orienting member and having a plunger connected to said link for moving the same through said bore, and electric circuit means for energizing said solenoid, whereby said second resilient means is compressed between said link and said orienting member when, upon energization of said solenoid, rotation of said orienting member is blocked.

No references cited.